United States Patent
Ozaki et al.

(10) Patent No.: US 12,454,463 B2
(45) Date of Patent: Oct. 28, 2025

(54) ALUMINA, ALUMINA SLURRY, ALUMINA FILM, LAMINATE SEPARATOR, NONAQUEOUS ELECTROLYTE SECONDARY BATTERY AND MANUFACTURING METHOD THEREOF

(71) Applicant: SUMITOMO CHEMICAL COMPANY, LIMITED, Tokyo (JP)

(72) Inventors: Hirotaka Ozaki, Niihama (JP); Toyohisa Uda, Niihama (JP); Hiroyuki Ando, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 1158 days.

(21) Appl. No.: 17/418,239

(22) PCT Filed: Dec. 24, 2019

(86) PCT No.: PCT/JP2019/050592
§ 371 (c)(1),
(2) Date: Jun. 24, 2021

(87) PCT Pub. No.: WO2020/138074
PCT Pub. Date: Jul. 2, 2020

(65) Prior Publication Data
US 2022/0081309 A1    Mar. 17, 2022

(30) Foreign Application Priority Data

Dec. 26, 2018    (JP) .................................. 2018-242482

(51) Int. Cl.
*C01F 7/02*    (2022.01)
*H01M 50/431*    (2021.01)
(Continued)

(52) U.S. Cl.
CPC ............ *C01F 7/02* (2013.01); *H01M 50/431* (2021.01); *H01M 50/443* (2021.01);
(Continued)

(58) Field of Classification Search
None
See application file for complete search history.

(56) References Cited

U.S. PATENT DOCUMENTS 3,655,330 A * 4/1972 Rettew .................... C30B 29/26
264/658
2009/0136672 A1    5/2009 Panz et al.
(Continued)

FOREIGN PATENT DOCUMENTS

CN    103818939 A    5/2014
CN    104956518 A    9/2015
(Continued)

OTHER PUBLICATIONS

Komarneni, S., et al. Water adsorption and desorption isotherms of silica and alumina mesoporous molecular sieves. Journal of Porous Materials 3, 99-106 (1996). (Year: 1996).*
(Continued)

*Primary Examiner* — Anthony J Zimmer
*Assistant Examiner* — Zachary John Baum
(74) *Attorney, Agent, or Firm* — Foley & Lardner LLP (57) ABSTRACT

Disclosed is alumina having a water desorption index H ($=(V_{d0.5}-V_{a0.5})\div V_{a0.9}$) of 0.15 or less in a water adsorption/desorption isotherm at 25° C., where $V_{d0.5}$ represents a water adsorption amount [mg/g] per 1 g of alumina in the desorption isotherm at a relative water vapor pressure of 0.5, $V_{a0.5}$ represents a water adsorption amount [mg/g] per 1 g of alumina in the adsorption isotherm at a relative water vapor pressure of 0.5, and $V_{a0.9}$ represents a water adsorption
(Continued)

amount [mg/g] per 1 g of alumina in the adsorption isotherm at a relative water vapor pressure of 0.9.

10 Claims, 2 Drawing Sheets

(51) Int. Cl.
　　　 *H01M 50/443*　　　(2021.01)
　　　 *H01M 50/449*　　　(2021.01)

(52) U.S. Cl.
　　　 CPC ....... *H01M 50/449* (2021.01); *C01P 2004/51* (2013.01); *C01P 2004/61* (2013.01); *C01P 2006/12* (2013.01)

(56) References Cited

U.S. PATENT DOCUMENTS

| | | | |
|---|---|---|---|
| 2015/0315442 A1* | 11/2015 | Hofius | C01G 45/1242 51/308 |
| 2016/0002062 A1 | 1/2016 | Kita et al. | |
| 2016/0344009 A1 | 11/2016 | Suzuki et al. | |
| 2016/0351880 A1 | 12/2016 | Yamada et al. | |
| 2017/0162850 A1 | 6/2017 | Murakami et al. | |
| 2018/0351147 A1 | 12/2018 | Ozaki et al. | |

FOREIGN PATENT DOCUMENTS

| | | |
|---|---|---|
| CN | 105189356 A | 12/2015 |
| EP | 3 401 281 A1 | 11/2018 |
| EP | 3 401 282 A1 | 11/2018 |
| JP | 2004-227972 A | 8/2004 |
| JP | 2010-126385 A | 6/2010 |
| JP | 2011-510891 A | 4/2011 |
| JP | 2016-108210 A | 6/2016 |
| JP | 2017-095333 A | 6/2017 |
| JP | 2018-177550 A | 11/2018 |
| WO | WO-2018/021143 A1 | 2/2018 |
| WO | WO-2018/088004 A1 | 5/2018 |

OTHER PUBLICATIONS

Tafreshi, M., et al. Infrared spectroscopy studies on sol-gel prepared alumina powders. Materials Science (Medžiagotyra). vol. 21, No. 1. 2015. (Year: 2015).*

European Examination Report on EP Appl. Ser. No. 19903120.4 dated May 25, 2022 (5 pages).

International Preliminary Report on Patentability (including WO-ISA) from PCT/JP2019/050592 Dtd Jul. 8, 2021, (6 pages).

International Search Report from PCT/JP2019/050592 Dtd Jan. 28, 2020, (5 pages).

European Extended Search Report, dated Nov. 12, 2021, issued in corresponding European Patent Application No. 19903120.4, (6 pages).

Decision to Grant issued in corresponding Korean Patent Application No. 10-2021-7019469 dated Mar. 29, 2022 (4 pages).

Summons to attend oral proceedings pursuant to Rule 115(1) EPC issued in corresponding European Patent Application No. 19903120.4, dated Jan. 4, 2023.

Chinese Office Action issued in connection with CN Appl. Ser. No. 201980086238.1 dated Oct. 21, 2022 (14 pages).

* cited by examiner

ALUMINA, ALUMINA SLURRY, ALUMINA FILM, LAMINATE SEPARATOR, NONAQUEOUS ELECTROLYTE SECONDARY BATTERY AND MANUFACTURING METHOD THEREOF

CROSS-REFERENCE TO RELATED APPLICATIONS

The present application claims priority under 37 U.S.C. § 371 to International Patent Application No. PCT/JP2019/050592, filed Dec. 24, 2019, which claims priority to and the benefit of Japanese Patent Application No. 2018-242482, filed on Dec. 26, 2018. The contents of these applications are hereby incorporated by reference in their entireties.

TECHNICAL FIELD

The present disclosure relates to alumina, an alumina slurry, an alumina film, a laminate separator, a nonaqueous electrolyte secondary battery, and a manufacturing method thereof.

BACKGROUND ART

Alumina has hitherto been widely used in various applications because of having excellent heat resistance, insulation properties, abrasion resistance, corrosion resistance, and the like. Examples of such applications include a light-transmitting tube for high pressure sodium lamp, a single crystal material such as sapphire for watch window, a high strength ceramics tool, an abrasive for magnet tape, and a nonaqueous electrolyte secondary battery.

For example, Patent Document 1 describes a technique of producing a separator for a nonaqueous electrolyte secondary battery using an alumina slurry obtained by dispersing alumina in water.

Patent Document 2 describes a technique of preparing alumina ceramics by firing an alumina molded body formed from an alumina slurry obtained by dispersing alumina, the alumina molded body being formed by molding a powder that is prepared from an alumina slurry by a spray drying method, or formed by a slip casting method using the alumina slurry.

PRIOR ART DOCUMENTS

Patent Documents

Patent Document 1: JP 2004-227972A
Patent Document 2: JP 2017-95333A

In a technique using alumina, such as the above-described technique using alumina for a nonaqueous electrolyte secondary battery or alumina ceramics, alumina is often dispersed in a solvent (for example, water) to prepare an alumina slurry, and thus to use the alumina slurry in various production processes. When dispersion stability of the alumina slurry is insufficient, characteristics of a product, the production cost (for example, yield) and the like are affected, and therefore alumina having more excellent dispersion stability is required.

SUMMARY OF THE INVENTION

Problems to be Solved by the Invention

The present invention has been made in view of the above circumstances, and a main object of the present invention is to provide alumina having excellent dispersion stability, an alumina slurry and an alumina film including the alumina, a laminate separator and a nonaqueous electrolyte secondary battery using the alumina film, and a method of manufacturing a nonaqueous electrolyte secondary battery.

Solutions to the Problems

Aspect 1 of the present invention provides alumina having a water desorption index H defined by the following formula (1) of 0.15 or less in a water adsorption/desorption isotherm at 25° C.

$$\text{Water desorption index } H = (V_{d0.5} - V_{a0.5}) \div V_{a0.9} \qquad (1)$$

where
$V_{d0.5}$ represents a water adsorption amount [mg/g] per 1 g of alumina in a desorption isotherm at a relative water vapor pressure of 0.5,
$V_{a0.5}$ represents a water adsorption amount [mg/g] per 1 g of alumina in an adsorption isotherm at a relative water vapor pressure of 0.5, and
$V_{a0.9}$ represents a water adsorption amount [mg/g] per 1 g of alumina in the adsorption isotherm at a relative water vapor pressure of 0.9.

Aspect 2 of the present invention provides the alumina according to Aspect 1, in which a maximum value of absorbance at 3000 to 3200 $cm^{-1}$ is 0.30 or less in a transmission infrared absorption spectrum obtained by measuring a sample, prepared using the alumina and having a diameter of 10 mmφ and a mass of 20 mg, by Fourier transform infrared spectroscopy.

Aspect 3 of the present invention provides the alumina according to Aspect 1 or 2, containing one or more elements selected from the group consisting of K, Mg, Ca, Sr, Ba, and La, in which a total content of the element is 200 ppm by mass or more and 50000 ppm by mass or less.

Aspect 4 of the present invention provides the alumina according to any one of Aspects 1 to 3, having a 10% particle diameter D10 of 0.25 μm or more in a volume-based cumulative particle size distribution.

Aspect 5 of the present invention provides the alumina according to any one of Aspects 1 to 4, having a 90% particle diameter D90 of 3.0 μm or less in the volume-based cumulative particle size distribution.

Aspect 6 of the present invention provides the alumina according to Aspect 1 to 5, having a BET specific surface area of 1 $m^2/g$ or more and 10 $m^2/g$ or less.

Aspect 7 of the present invention provides an alumina slurry comprising:
the alumina according to any one of Aspect 1 to 6;
a binder; and
a solvent.

Aspect 8 of the present invention provides an alumina film comprising:
the alumina according to any one of Aspect 1 to 6; and
a binder.

Aspect 9 of the present invention provides a laminate separator comprising:
a separator; and
the alumina film according to Aspect 8 formed on a surface of the separator.

Aspect 10 of the present invention provides a nonaqueous electrolyte secondary battery comprising:
the alumina film according to Aspect 8 formed on a surface of at least one of a positive electrode;
a negative electrode; and
a separator.

Aspect 11 of the present invention provides a method of manufacturing a nonaqueous electrolyte secondary battery, comprising:

applying the alumina slurry according to Aspect 7 to a surface of at least one of a positive electrode, a negative electrode, and a separator; and drying the alumina slurry to form an alumina film.

Effects of the Invention

The present invention provides alumina having excellent dispersion stability, an alumina slurry and an alumina film including the alumina, a laminate separator and a nonaqueous electrolyte secondary battery using the alumina film, and a method of manufacturing a nonaqueous electrolyte secondary battery.

EMBODIMENT OF THE INVENTION

Hereinafter, alumina according to an embodiment of the present invention will be described in detail.

<1. Alumina>

The alumina according to the embodiment of the present invention has a water desorption index H defined by the following formula (1) of 0.15 or less in a water adsorption/desorption isotherm at 25° C.

$$\text{Water desorption index } H=(V_{d0.5}-V_{a0.5})\div V_{a0.9} \quad (1)$$

where $V_{d0.5}$ represents a water adsorption amount [mg/g] per 1 g of alumina in a desorption isotherm at a relative water vapor pressure of 0.5, $V_{a0.5}$ represents a water adsorption amount [mg/g] per 1 g of alumina in an adsorption isotherm at a relative water vapor pressure of 0.5, and $V_{a0.9}$ represents a water adsorption amount [mg/g] per 1 g of alumina in the adsorption isotherm at a relative water vapor pressure of 0.9.

The present inventors have conceived that it is effective to reduce affinity between alumina and water in order to improve dispersion stability of alumina. As a result of intensive studies, the present inventors have found that as an index of the affinity between alumina and water, the water desorption index H is suitably controlled; that is, the water desorption index H is controlled to 0.15 or less, whereby the affinity between alumina and water is reduced, and excellent dispersion stability is obtained. When water is mixed into the nonaqueous electrolyte secondary battery, the water reacts with an electrolyte solution to generate gas, and reliability of the nonaqueous electrolyte secondary battery is impaired. Therefore, alumina having a small water content can be preferably used for the nonaqueous electrolyte secondary battery.

The water desorption index H is an index indicating a difference in water adsorption amount between a water adsorption process and a water desorption process, that is, a degree of hysteresis in a water adsorption/desorption isotherm, and the smaller the water desorption index H, the smaller the hysteresis. In alumina having a small hysteresis, water is easily desorbed. It is considered that in alumina from which water is easily desorbed, the amount of OH groups which are hydrophilic groups on an alumina surface is small, and the water content can be reduced.

Figure 1:
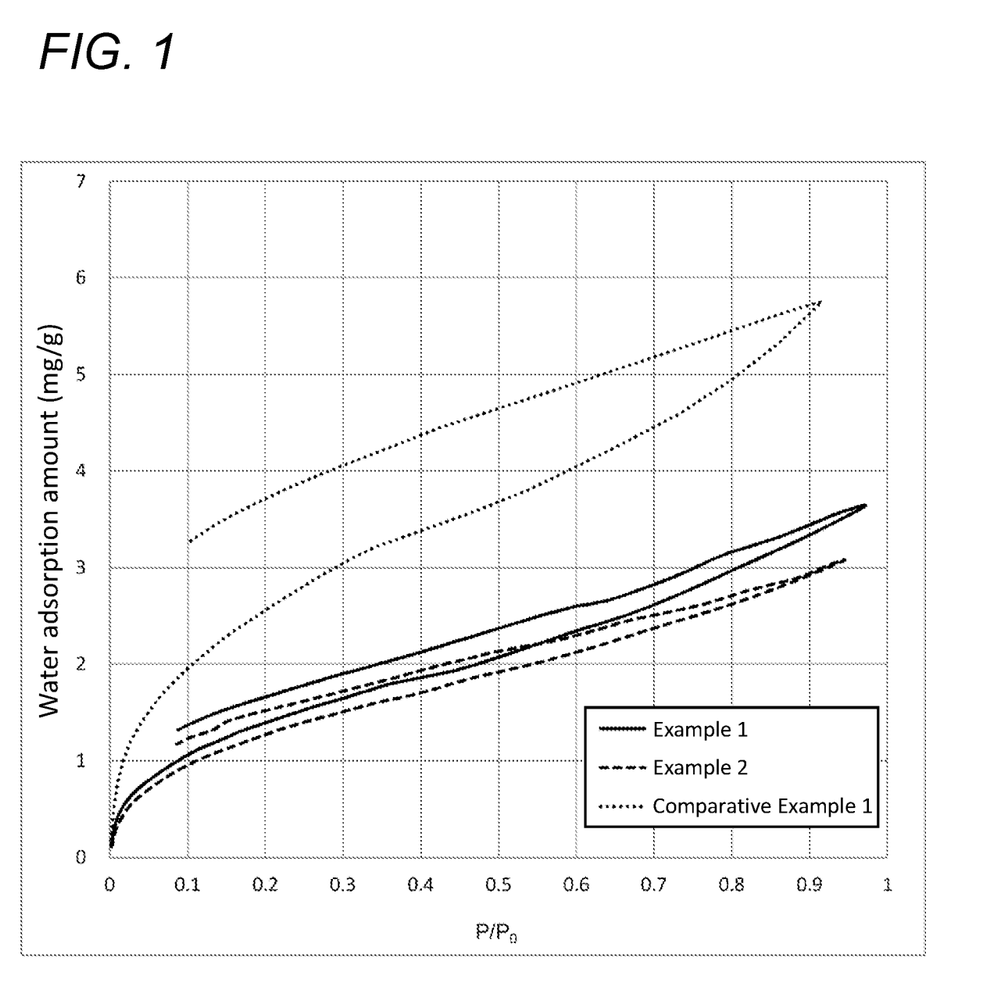
FIG. 1 is a water adsorption/desorption isotherm at 25° C. of alumina of Example 1 and Comparative Example 1 of an embodiment of the present invention.

Hereinafter, the water desorption index H will be described in detail with reference to FIG. 1 showing an example of the water adsorption/desorption isotherm. FIG. 1 shows the water adsorption/desorption isotherms at 25° C. of alumina of Examples 1 and 2, and Comparative Example 1 of an embodiment of the present invention, which will be described later.

In the present specification, the water adsorption/desorption isotherm in which a relative water vapor pressure $P/P_0$ at 25° C. is in a range of 0 to more than 0.9 is used. P represents a water vapor pressure at 25° C., and $P_0$ represents a saturated water vapor pressure at 25° C. The water adsorption/desorption isotherm may be measured using a vapor adsorption amount measuring apparatus, for example, "BELSORP-18" manufactured by MicrotracBEL Corp.

As shown in FIG. 1, in the adsorption isotherm, as the relative water vapor pressure $P/P_0$ increases, water is adsorbed to alumina, and the water adsorption amount increases. The relative water vapor pressure $P/P_0$ is increased until the relative water vapor pressure $P/P_0$ reaches more than 0.9 to advance adsorption of water to alumina, and then a relative vapor pressure is decreased to advance desorption of water from alumina. In the desorption isotherm, as the relative water vapor pressure $P/P_0$ decreases, water is desorbed from alumina, and the water adsorption amount decreases.

Regarding the water adsorption amount when the relative water vapor pressure $P/P_0$ is 0.5, the water adsorption amount $V_{d0.5}$ in the desorption isotherm is larger than the water adsorption amount $V_{a0.5}$ in the adsorption isotherm; that is, $(V_{d0.5}-V_{a0.5})$ is more than 0, and hysteresis exists between the adsorption process and the desorption process. Comparing Example 1 with Comparative Example 1, the value of $(V_{d0.5}-V_{a0.5})$ is smaller in Example 1, and the hysteresis is smaller in Example 1.

In the present application, considering that the hysteresis is affected by the relative water vapor pressure $P/P_0$, the water desorption index H that is a ratio of $(V_{d0.5}-V_{a0.5})$ to $V_{a0.9}$ is defined as an index of the hysteresis, and is controlled to 0.15 or less. As a result, the affinity between alumina and water can be lowered to reduce the water content of alumina, and alumina having excellent dispersion stability can be obtained. The water desorption index H is preferably 0.12 or less, and more preferably 0.10 or less.

The alumina according to the embodiment of the present invention is not particularly limited, and may be α-alumina, γ-alumina, η-alumina, θ-alumina, δ-alumina, χ-alumina, κ-alumina, boehmite or pseudo-boehmite, or may be a mixture of two or more selected from these aluminas.

When alumina is used for a nonaqueous electrolyte secondary battery, α-alumina excellent in insulating properties and heat resistance and chemically stable is preferable. The α-alumina referred to in the present application refers to alumina having an α-phase as a main crystal phase. That is, an alumina comprising the α-phase as the main crystal phase is referred to as α-alumina even if alumina of another crystal phase and/or an alumina hydrate or the like described later are also contained. The crystal phase can be specified by, for example, a powder X-ray diffraction method or the like. A case where among all diffraction peaks of an alumina obtained by measurement by the powder X-ray diffraction method in a range of 10 to 70 degrees of a diffraction angle 2θ, the peak having the highest intensity is assigned to the α phase alumina, the alumina is referred to as alumina having the α phase as the main crystal phase.

The alumina according to the embodiment of the present invention may include one or more alumina trihydrates (represented by $Al_2O_3 \cdot 3H_2O$ or $Al(OH)_3$ and sometimes hereinafter referred to as "gibbsite type") such as gibbsite, bayerite, and nordstrandite as long as the effect obtained by the alumina according to the embodiment of the present invention is not impaired.

In the alumina according to the embodiment of the present invention, a maximum value of absorbance at 3000 to 3200 $cm^{-1}$ is preferably 0.30 or less in a transmission infrared absorption spectrum obtained by measuring a sample, prepared using the alumina and having a diameter of 10 mmφ and a mass of 20 mg, by Fourier transform infrared spectroscopy. The absorption appearing in a range of 2800 to 3800 $cm^{-1}$ is due to OH species on the alumina surface. By controlling the maximum value of the absorbance at 3000 to 3200 $cm^{-1}$ to 0.30 or less, the amount of OH species present on the alumina surface can be reduced, and the affinity between alumina and water is reduced, so that excellent dispersion stability of alumina can be easily secured.

The alumina according to the embodiment of the present invention preferably contains one or more elements selected from the group consisting of K, Mg, Ca, Sr, Ba, and La, in a range in which a total content of the element is 200 ppm by mass or more and 50000 ppm by mass or less. By controlling the content within such a range, generation of gibbsite species on the alumina surface can be suppressed, so that excellent dispersion stability can be easily secured. The total content of one or more elements selected from the group consisting of K, Mg, Ca, Sr, Ba, and La is more preferably 500 ppm by mass or more, still more preferably 2000 ppm by mass or more, and more preferably 20000 ppm by mass or less, still more preferably 10000 ppm by mass or less.

The contents of K, Mg, Ca, Sr, Ba, and La may be measured by ICP emission spectrometry.

The gibbsite species deteriorates the stability of the electrolyte solution when alumina is used for a nonaqueous electrolyte secondary battery. Thus, the alumina in which the generation of gibbsite species is suppressed is preferably used for a nonaqueous electrolyte secondary battery.

Purity of the alumina according to the embodiment of the present invention is not particularly limited. Here, the "purity of alumina" means the purity in all the components except for K, Mg, Ca, Sr, Ba, and La.

When alumina is used for a nonaqueous electrolyte secondary battery, the purity of alumina is preferably 99% by mass or more. If the purity of alumina is 99% by mass or more, Si, Na, Fe, and the like contained in alumina may decrease, thus to obtain good electrical insulation properties, and a mixing amount of metallic foreign matters that can cause a short circuit can be reduced. When alumina is used for a nonaqueous electrolyte secondary battery, the purity of alumina is preferably 99.9% by mass or more, and more preferably 99.99% by mass or more.

The purity of alumina may be calculated from the following formula (1) by using, for example, a total content of K, Mg, Ca, Sr, Ba, and La contained in 100% by mass of alumina and a total content of $SiO_2$, $Na_2O$, CuO, $Fe_2O_3$, and $ZrO_2$ which are representative impurities.

Purity of alumina (% by mass)=100×{100−(sum of contents of K, Mg, Ca, Sr, Ba, and La [% by mass])−(sum of contents of $SiO_2$, $Na_2O$, CuO, $Fe_2O_3$, and $ZrO_2$ [% by mass])}÷{100−(sum of contents of K, Mg, Ca, Sr, Ba, and La [% by mass])} (1)

The contents of $SiO_2$, $Na_2O$, CuO, $Fe_2O_3$, and $ZrO_2$ may be determined by measuring the contents of Si, Na, Cu, Fe, and Zr by ICP emission spectrometry and converting the measured contents into the contents of oxides ($SiO_2$, $Na_2O$, CuO, $Fe_2O_3$, and $ZrO_2$) corresponding to the respective elements.

The alumina according to the embodiment of the present invention has a BET specific surface area of preferably 1 $m^2/g$ or more, more preferably 3 $m^2/g$ or more, and preferably 10 $m^2/g$ or less, more preferably 7 $m^2/g$ or less. By controlling the BET specific surface area within such a range, the water content of alumina can be more easily reduced, and excellent dispersion stability can be more easily secured.

The BET specific surface area can be determined by an $N_2$ adsorption method in accordance with the method specified in JIS-Z 8830 (2013).

The alumina according to the embodiment of the present invention has a 10% particle diameter D10 (that is, the particle diameter corresponding to a cumulative percentage of 10% from the fine particle side) in a volume-based cumulative particle size distribution of preferably 0.25 μm or more, and more preferably 0.30 μm or more. By controlling D10 within such a range, too fine alumina can be reduced, so that an alumina film excellent in uniformity and/or air permeability can be obtained, and the dispersibility of alumina is improved, so that an alumina slurry having a low viscosity can be easily obtained even when the concentration of alumina is high.

The alumina according to the embodiment of the present invention has a 90% particle diameter D90 (that is, the particle diameter corresponding to a cumulative percentage of 90% from the fine particle side) in the volume-based cumulative particle size distribution of preferably 3.0 μm or less, and more preferably 2.0 μm or less. By controlling D90 within such a range, too coarse alumina can be reduced, so that an alumina film excellent in uniformity and/or heat resistance can be obtained, and precipitation of alumina in the alumina slurry can be prevented to enhance the dispersion stability of the alumina slurry. Furthermore, by controlling D90 within such a range, when alumina is used for ceramic applications, an alumina sintered body having excellent strength can be easily obtained.

The alumina according to the embodiment of the present invention has a 50% particle diameter D50 (that is, the particle diameter corresponding to a cumulative percentage of 50% from the fine particle side) in the volume-based cumulative particle size distribution of preferably 0.3 μm or more, more preferably 0.4 μm or more, and preferably 1.0 μm or less, more preferably 0.8 μm or less. The range of D50 is preferably 0.55 μm or more and 0.70 μm or less. By controlling D50 within such a range, too fine alumina and too coarse alumina can be reduced. Thus, an alumina film having excellent uniformity in thickness and/or physical properties can be obtained. In addition, since porosity of the alumina film can be suitably controlled, when the alumina film is applied, for example, to a surface of at least one of a positive electrode, a negative electrode, and a separator of the nonaqueous electrolyte secondary battery, ionic permeability can be sufficiently secured.

D10, D50, and D90 may be measured by a laser diffraction method using a laser diffraction/light scattering type particle size distribution analyzer, for example, "Microtrac MT 3300 EXII" manufactured by MicrotracBEL Corp.

The alumina according to the embodiment of the present invention may contain coarse particles in size of 20 μm or more in a trace amount which is not detectable by a particle size distribution meter. The content of coarse particles having a particle diameter of 20 μm or more is preferably 100 ppm or less, and more preferably 10 ppm or less, based on the total mass of the alumina according to the embodiment of the present invention. If the content of the coarse particles having a particle diameter of 20 μm or more exceeds 100 ppm, it may become difficult to realize thinning of the obtained alumina film, and voids may be likely to form around the coarse particles in the obtained alumina film, leading to deterioration of the heat resistance of the obtained alumina film.

Examples of a method of producing alumina include a method of firing aluminum hydroxide produced by the Bayer method; a method of firing aluminum hydroxide produced by an aluminum alkoxide method; a synthesis method using organic aluminum; a method of firing transition alumina or an alumina powder that becomes transition alumina by heat treatment, in atmosphere gas containing hydrogen chloride; and methods described in JP11-049515A, JP2010-150090A, JP2008-100903A, JP2002-047009A, JP2001-354413A, and the like.

Examples of the Bayer method include a method which includes: producing a supersaturated aqueous sodium aluminate solution; adding seeds to the aqueous solution to precipitate an aluminum component contained in the aqueous solution; washing the obtained slurry including aluminum hydroxide; and drying the slurry to obtain dry-powdered aluminum hydroxide.

Alumina can be obtained by firing the obtained dry-powdered aluminum hydroxide.

Firing of aluminum hydroxide is usually carried out in a state of being filled into a firing container. Examples of the firing container include a sheath and a sagger.

The firing container is preferably made of alumina from the viewpoint of pollution control of alumina to be obtained, and particularly preferably made of high-purity alumina. However, from the viewpoint of heat resistance and usage cycle characteristics of the firing container, the material of the firing container may contain a silica component or the like within a suitable range.

Although a method of filling aluminum hydroxide into the firing container is not particularly limited, aluminum hydroxide may be filled by its own weight, or may be filled after being compressed.

Examples of a firing furnace used for firing aluminum hydroxide include a tunnel furnace, a roller-hearth furnace, a pusher furnace, a shuttle furnace, a carriage lifting furnace, a muffle furnace, a rotary furnace, a tubular furnace, and a fluidized firing furnace.

A firing temperature of aluminum hydroxide, a temperature rising rate to the firing temperature, and a firing time are appropriately selected so as to obtain alumina having desired physical properties.

The firing temperature of aluminum hydroxide is, for example, 1000° C. or more and 1450° C. or less, preferably 1000° C. or more and 1350° C. or less, the temperature rising rate when the temperature is raised to this firing temperature is usually 30° C./hour or more and 500° C./hour or less, and the firing time of aluminum hydroxide is usually 0.5 hours or more and 24 hours or less, and preferably 1 hour or more and 20 hours or less.

Aluminum hydroxide may be fired, for example, in an air atmosphere, or may be fired in an inert gas atmosphere such as a nitrogen gas or an argon gas. Alternatively, aluminum hydroxide may be fired in an atmosphere having a high partial water vapor pressure like a gas furnace in which firing is carried out by combustion using a propane gas or the like. Usually, when firing is carried out in an atmosphere having a high partial water vapor pressure, unlike in the air atmosphere, the resulting alumina particles are easily burned and fastened due to the effect of water vapor; that is, the alumina particles are easily shrunk by firing.

The BET specific surface area of alumina to be obtained can be controlled by the firing conditions of aluminum hydroxide. That is, by suitably controlling the firing conditions within the above range, alumina having a preferred BET specific surface area of 1 $m^2$/g or more and 10 $m^2$/g or less can be obtained. The BET specific surface area is more preferably 3 $m^2$/g or more and more preferably 7 $m^2$/g or less.

The obtained alumina is pulverized by a jet mill using superheated steam having a temperature of 150 to 500° C. and a pressure of 0.5 to 5 MPa as a pulverizing gas. As a result, the water desorption index H can be controlled to 0.15 or less. The temperature and pressure of the superheated steam are the temperature and pressure at a discharge port of a jet nozzle of the jet mill.

The jet mill may include a classifying device. By using the classifying device, it is easy to control the particle diameter (D10, D50 and D90) of alumina within a desired range.

A method of adding one or more elements selected from the group consisting of K, Mg, Ca, Sr, Ba, and La to alumina is not particularly limited, and examples thereof include a method of adding an oxide, a hydroxide, a carbonate, or a nitrate (hereinafter may be referred to as "oxide or the like") of these elements to alumina, mixing, and then firing the resulting mixture.

The oxide or the like may be added to alumina as a solid or a solution thereof. The solvent used for preparing the solution may be suitably selected in consideration of the solubility, concentration, and the like of the oxide and the like.

The oxide or the like is preferably added to alumina before the alumina is pulverized by the jet mill, or added to the alumina at the same time as the alumina is pulverized by the jet mill. When the oxide or the like is added to alumina before the alumina is pulverized by the jet mill, the oxide or the like and the alumina may be mixed using a mixing machine, or the oxide or the like and the alumina may be dispersed in an alcohol solution by ultrasonic waves and then evaporated to dryness.

The alumina according to the embodiment of the present invention may be further subjected to surface treatment or the like. A surface treatment method is not particularly limited as long as the effect obtained by the alumina according to the embodiment of the present invention is not impaired, and examples thereof include a method using a surface treatment agent such as a coupling agent or a surfactant. The coupling agent may have a functional group such as an amino group, an epoxy group, or an isocyanate group in its molecular structure, and has an effect of improving a binding property between alumina and a binder in an alumina film including them. The surfactant has an effect of improving the dispersibility of alumina in the alumina slurry.

<2. Alumina Slurry>

The alumina slurry according to the embodiment of the present invention includes: the alumina according to the embodiment of the present invention; a binder; and a solvent.

The binder may be, for example, a fluororesin such as polyvinylidene fluoride (PVDF), polytetrafluoroethylene (PTFE), or a tetrafluoroethylene-hexafluoropropylene copolymer (FEP); a polyacrylic acid derivative such as polyacrylic acid, polyacrylic acid methyl ester, polyacrylic acid ethyl ester, or polyacrylic acid hexyl ester; a polymethacrylic acid derivatives such as polymethacrylic acid, polymethacrylic acid methyl ester, polymethacrylic acid ethyl ester, or polymethacrylic acid hexyl ester; polyamide, polyimide, polyamideimide, polyvinyl acetate, polyvinylpyrrolidone, polyether, polyether sulfone, hexafluoropolypropylene, styrene butadiene rubber, carboxymethyl cellulose (hereinafter referred to as CMC), polyacrylonitrile or a derivative thereof, polyethylene, polypropylene, aramid resin, and the like; or a salt thereof. Alternatively, the binder may be a mixture of two or more materials selected from the above materials.

Furthermore, the binder may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

The solvent may be, for example, water, alcohol, acetone, tetrahydrofuran, methylene chloride, chloroform, dimethylformamide, N-methyl-2 pyrrolidone (NMP), cyclohexane, xylene, cyclohexanone, or a mixed solvent thereof.

The content of the binder in the alumina slurry according to the embodiment of the present invention is not particularly limited, and may be, for example, 0.1 to 20 parts by mass with respect to 100 parts by mass of alumina.

The content of the solvent in the alumina slurry according to the embodiment of the present invention is not particularly limited, and may be, for example, 10 to 500 parts by mass with respect to 100 parts by mass of alumina.

The alumina slurry according to the embodiment of the present invention may contain an additive for the purpose of, for example, stabilizing dispersion and improving coatability, in addition to the above-described components. Examples of the additive include a dispersant, a thickener, a leveling agent, an antioxidant, an antifoaming agent, a pH adjusting agent containing an acid or an alkali, and a reaction inhibitor having a function of suppressing side reactions such as electrolyte solution decomposition. When alumina is used for the nonaqueous electrolyte secondary battery, the additive is not particularly limited as long as it is chemically stable in the use range of the nonaqueous electrolyte secondary battery and does not significantly affect battery reaction. Although the additive that can be removed when an alumina film is formed is preferable, the additive may remain in the alumina film. The content of the additive is not particularly limited, and may be, for example, 10 parts by mass or less with respect to 100 parts by mass of alumina.

The alumina slurry according to the embodiment of the present invention can be prepared by mixing the alumina according to the embodiment of the present invention, a binder, and a solvent, and dispersing the obtained mixture. A method of dispersing the alumina slurry is not particularly limited, and a stirring method using a known planetary mixer or the like, or a dispersion method using ultrasonic irradiation or a bead mill can be used.

For example, when alumina ceramics, that is, an alumina sintered body is produced by a slip casting method, the alumina slurry is filled in an inner cavity of a gypsum mold, alumina in the alumina slurry deposits to an inner wall of the gypsum mold while a solvent of the alumina slurry is absorbed by a gypsum, thereby producing an alumina molded body having a desired shape, and then the alumina molded body is fired to obtain an alumina sintered body. In order to enhance productivity of the alumina sintered body, a deposition rate is preferably high from the viewpoint of obtaining an alumina molded body in a shorter time.

The alumina slurry according to the embodiment of the present invention includes the alumina according to the embodiment of the present invention having a small amount of OH groups on the surface and low affinity with water. Thus, when the alumina slurry according to the embodiment of the present invention particularly includes water, water is easily discharged from alumina having low affinity with water into a gypsum mold at the time of performing slip casting using the alumina slurry, the deposition rate can be increased, and an alumina molded body can be obtained in a shorter time.

When the alumina slurry having a high deposition rate is used, a density of the alumina sintered body may be lower than when the alumina slurry having a low deposition rate is used. However, by using the alumina slurry according to the embodiment of the present invention, the density of the alumina sintered body can be increased in addition to increasing the deposition rate as described above.

<3. Alumina Film, Laminate Separator, Nonaqueous Electrolyte Secondary Battery>

The alumina film according to the embodiment of the present invention includes: the alumina according to the embodiment of the present invention; and a binder.

As described above, the alumina according to the embodiment of the present invention can be preferably used for a nonaqueous electrolyte secondary battery because the content of water that causes deterioration of an electrolyte solution in the nonaqueous electrolyte secondary battery is small. More specifically, in the nonaqueous electrolyte secondary battery, the alumina film according to the embodiment of the present invention can be used by being formed on the surface of at least one of the positive electrode, the negative electrode, and the separator. The laminate separator according to the embodiment of the present invention includes a separator and the alumina film according to the embodiment of the present invention formed on the surface of the separator.

Hereinafter, an embodiment in which the alumina according to the embodiment of the present invention is used for the nonaqueous electrolyte secondary battery will be described in detail.

The alumina film including the alumina according to the embodiment of the present invention and a binder can be formed from the alumina slurry according to the embodiment of the present invention, and is formed on the surface of at least one of the positive electrode, the negative electrode, and the separator in the nonaqueous electrolyte secondary battery. The alumina film is suitably used for a nonaqueous electrolyte secondary battery including: an electrode group (laminated electrode group) formed by stacking the alumina film together with a positive electrode, a negative electrode, and a separator, or an electrode group (wound electrode group) formed by stacking and winding the alumina film together with a positive electrode, a negative electrode, and a separator; and an electrolyte solution.

Examples of a method of suitably producing such a nonaqueous electrolyte secondary battery include a method including: applying an alumina slurry to a surface of a positive electrode and/or a negative electrode which include an electrode mix layer containing an electrode active material (positive electrode active material or negative electrode active material) and a binder; and drying the alumina slurry to form an alumina film. Furthermore, examples of the method of suitably producing such a nonaqueous electrolyte secondary battery include a method including: applying an alumina slurry not to the surface of the positive electrode and/or the surface of the negative electrode surface, but to a surface of a separator; and drying the alumina slurry to form an alumina film.

More specifically, for example, as a method of manufacturing a nonaqueous electrolyte secondary battery including a wound electrode group in which an alumina film is formed on a negative electrode, there is a method in which: joining one end of a positive electrode lead to a negative electrode lead joint having an alumina film formed on a surface thereof; joining one end of a negative electrode lead to a positive electrode lead joint; stacking the negative electrode, the alumina film, a separator and a positive electrode in this order to obtain a laminated electrode group; winding the laminated electrode group to form a wound electrode group; housing the wound electrode group in a battery can in a state of being sandwiched between an upper insulating ring and a lower insulating ring; and injecting an electrolyte solution in the battery can and then closing the battery can with a battery lid.

The method of applying the alumina slurry to the surface of the positive electrode or the negative electrode or the surface of the separator is not particularly limited, and may be, for example, a known doctor blade method, a gravure printing method, or the like. The drying method is not particularly limited, and may be known hot air drying, vacuum drying, or the like. The thickness of the alumina film obtained after drying is preferably 0.3 μm or more, more preferably about 0.5 μm or more, and preferably 20 μm or less, more preferably about 10 μm or less.

Battery constituent materials such as a positive electrode, a negative electrode, a separator, and an electrolyte solution of the nonaqueous electrolyte secondary battery are not particularly limited, and conventionally known materials can be used. For example, a material disclosed in a known document such as WO 09/041722 can be used.

The porosity of the alumina film is preferably 30% by volume or more, and preferably 80% by volume or less, more preferably 60% by volume or less. By controlling the porosity in such a range, it is easy to obtain an alumina film having sufficient ionic permeability.

The separator is a porous film having a film shape and being disposed between the positive electrode and the negative electrode in the nonaqueous electrolyte secondary battery. The porous film is melted when the nonaqueous electrolyte secondary battery excessively generates heat and is made non-porous, thereby imparting a shutdown function for preventing an excessive current from flowing.

The porous film may be a porous and film-like substrate (polyolefin-based porous substrate) including a polyolefin-based resin as a main component, and has pores connected to each other inside thereof, and gas and/or liquid can permeate from one surface to the other surface.

Puncture strength of the porous film is preferably 3 N or more. As a result, for example, when the laminated electrode group is wound, when the wound electrode group is compressed, or when pressure is applied to the battery from the outside, it is possible to further suppress breakage of the separator by electrode active material particles which may lead to short circuit of the positive and negative electrodes. The puncture strength of the porous film is preferably 10 N or less, and more preferably 8 N or less.

The thickness of the porous film may be appropriately determined in consideration of the thickness of other members constituting the nonaqueous electrolyte secondary battery, and is preferably 4 μm or more, more preferably 5 μm or more, still more preferably 6 μm or more, and preferably 40 μm or less, more preferably 30 μm or less, still more preferably 15 μm or less.

From the viewpoint of further increasing an electrolyte solution holding amount and causing the shutdown function to work at a lower temperature, the porosity on a volume basis of the porous film is preferably 20% or more, more preferably 30% or more, and preferably 80% or less, more preferably 75% or less.

When the porous film is used as a separator, an average diameter of the pores (average pore diameter) of the porous film is preferably 0.3 μm or less, more preferably 0.14 μm or less from the viewpoint of further enhancing the ionic permeability and further preventing the particles from entering the positive electrode and the negative electrode.

A ratio of the polyolefin-based resin included in the porous film is usually 50% by volume or more, preferably 90% by volume or more, and more preferably 95% by volume or more with respect to the entire volume of the porous film. The polyolefin-based resin included in the porous film preferably includes a high molecular weight component having a weight average molecular weight of $5 \times 10^5$ or more and $15 \times 10^6$ or less. In particular, the polyolefin-based resin included in the porous film preferably includes a polyolefin component having a weight average molecular weight of 1 million or more, whereby strength of the porous film can be further enhanced.

Examples of the polyolefin-based resin included in the porous film include high molecular weight homopolymers or copolymers obtained by polymerizing monomers such as ethylene, propylene, 1-butene, 4-methyl-1-pentene, and 1-hexene. In particular, high molecular weight polyethylene including ethylene as a main component is preferable.

The porous film may be a single layer film composed of one layer, or may be a multilayer film formed of a plurality of layers. The multilayer film may be formed to include a plurality of the same layers, or may be formed from a plurality of different layers.

Such a layer may include only one polyolefin-based resin, or may contain two or more polyolefin-based resins. The porous film may contain components other than the polyolefin-based resin as long as its function is not impaired.

The air permeability of the porous film is usually 30 seconds/100 cc or more, preferably 50 seconds/100 cc or more, and usually 500 seconds/100 cc or less, preferably 300 seconds/100 cc or less in terms of Gurley value. This makes it easy to obtain sufficient ionic permeability when the porous film is used as a separator.

In consideration of the strength, film thickness, handleability, and weight of the porous film, in addition, from the viewpoint of further increasing the weight energy density and volume energy density of the nonaqueous electrolyte secondary battery when the porous film is used as a separator of the nonaqueous electrolyte secondary battery, a basis weight of the porous film is usually 4 g/m² or more and 20 g/m² or less, preferably 4 g/m² or more, more preferably 5 g/m² or more, and preferably 12 g/m² or less, more preferably 10 g/m² or less.

Next, a method of producing a porous film will be described. As a method of producing a porous film including a polyolefin-based resin as a main component, for example, when the porous film includes an ultrahigh molecular weight polyolefin and a low molecular weight hydrocarbon having a weight average molecular weight of 10000 or less, the porous film is preferably produced by the following method.

The porous film can be obtained by a method including, for example, (1) a step of kneading an ultrahigh molecular weight polyolefin, a low molecular weight hydrocarbon having a weight average molecular weight of 10000 or less, and a pore-forming agent to obtain a polyolefin resin composition, (2) a step (rolling step) of rolling the polyolefin resin composition with a rolling roll to form a sheet, (3) a step of removing the pore-forming agent from the sheet obtained in the step (2), and (4) a step of stretching the sheet obtained in the step (3) to obtain a porous film.

The sheet may be stretched before the pore-forming agent is removed from the sheet in the step (3), and the step (4) may be omitted.

Examples of the low molecular weight hydrocarbon include low molecular weight polyolefins such as polyolefin wax and low molecular weight polymethylenes such as Fischer-Tropsch wax. The weight average molecular weight of each of the low molecular weight polyolefin and the low molecular weight polymethylene is preferably 200 or more and preferably 3000 or less. When the weight average molecular weight of each of the low molecular weight polyolefin and the low molecular weight polymethylene is 200 or more, transpiration of the low molecular weight polyolefin and the low molecular weight polymethylene can be further suppressed when a porous film is produced using them. When the weight average molecular weight of each of the low molecular weight polyolefin and the low molecular weight polymethylene is 3000 or less, the low molecular weight polyolefin and the low molecular weight polymethylene can be more uniformly mixed with ultrahigh molecular weight polyolefin when a porous film is produced using the low molecular weight polyolefin and/or the low molecular weight polymethylene.

Examples of the pore-forming agent include inorganic fillers and plasticizers. Examples of the inorganic filler include those that can be dissolved in an acid-containing aqueous solvent, an alkali-containing aqueous solvent, an aqueous solvent mainly composed of water, and the like.

Examples of the inorganic filler that can be dissolved in the acid-containing aqueous solvent include calcium carbonate, magnesium carbonate, barium carbonate, zinc oxide, calcium oxide, aluminum hydroxide, magnesium hydroxide, calcium hydroxide, and calcium sulfate, and calcium carbonate is preferable because an inexpensive and fine powder is easily obtained. Examples of the inorganic filler that can be dissolved in the alkali-containing aqueous solvent include silicic acid and zinc oxide, and silicic acid is preferable because an inexpensive and fine powder is easily obtained. Examples of the inorganic filler that can be dissolved in the aqueous solvent mainly composed of water include calcium chloride, sodium chloride, and magnesium sulfate.

Examples of the plasticizer include low molecular weight nonvolatile hydrocarbon compounds such as liquid paraffin and mineral oil.

The air permeability of the laminate separator including the separator and the alumina film formed on the separator is preferably 30 seconds/100 cc or more, more preferably 50 seconds/100 cc or more, and preferably 1000 seconds/100 cc or less, more preferably 500 seconds/100 cc or less, still more preferably 350 seconds/100 cc or less in terms of Gurley value.

Dimensional stability of the laminate separator in a high temperature range where shutdown occurs, which is an index of safety of the laminate separator, is preferably 80% or more, more preferably 85% or more, still more preferably 90% or more in terms of a shape retention ratio upon heating. The high temperature range where shutdown occurs is 80 to 180° C., and may refer to about 130 to 170° C.

EXAMPLES

Hereinafter, an embodiment of the present invention will be described in detail with reference to Examples, but the present invention is not limited to only the following Examples. A sample preparation method and a method of evaluating each physical property are as follows.

(Water Desorption Index [Water Adsorption/Desorption Isotherm])

The water adsorption/desorption isotherm was measured using "BELSORP-18" manufactured by MicrotracBEL Corp. The measurement conditions were as follows.

Amount of charged sample: 1 g
Sample pretreatment conditions: treatment at 150° C. for 5 hours under vacuum
Thermostat temperature: 50° C.
Adsorption temperature: 25° C.
Saturated vapor pressure: 3.169 kPa
Adsorption equilibrium time: 500 seconds From the obtained water adsorption/desorption isotherm, the water desorption index H was determined by the following formula (1).

$$\text{Water desorption index } H = (V_{d0.5} - V_{a0.5}) \div V_{a0.9} \quad (1)$$

where
 $V_{d0.5}$ represents a water adsorption amount [mg/g] per 1 g of alumina in a desorption isotherm at a relative water vapor pressure of 0.5,
 $V_{a0.5}$ represents a water adsorption amount [mg/g] per 1 g of alumina in an adsorption isotherm at a relative water vapor pressure of 0.5, and
 $V_{a0.9}$ represents a water adsorption amount [mg/g] per 1 g of alumina in the adsorption isotherm at a relative water vapor pressure of 0.9.

(Infrared Absorption Spectrum)

A transmission infrared absorption spectrum was measured under the following conditions using Avatar 360 manufactured by Nicolet Instrument Corporation as a Fourier transform infrared spectrophotometer.

Measurement Conditions
 Resolution: 4 cm$^{-1}$
 Number of times of integrations: 256
 Window material: KBr (infrared transmission lower limit: 400 cm$^{-1}$)
 Measurement temperature: 30° C.

Sample Preparation Method
 20 mg of alumina was weighed, and a disk-shaped sample having a diameter of 10 mmφ was prepared.

Measurement Method
 After the sample was held at 30° C. for 60 minutes under vacuum, a sample spectrum was measured by a transmission method, and absorbance conversion was performed using a spectrum without sample measured at 30° C. under vacuum as a background.

(Contents of K, Mg, Ca, Sr, Ba, and La)
 The contents of K, Mg, Ca, Sr, Ba, and La were determined by measuring an evaluation sample by ICP emission spectrometry.

(Particle Diameter of Alumina [Particle Size Distribution of Alumina])

D10, D50, and D90 in the volume-based cumulative particle size distribution were measured by a laser diffraction method using a laser particle size distribution measuring apparatus ("Microtrac MT 3300 EXII" manufactured by MicrotracBEL Corp.). In the measurement, alumina was put in an aqueous 0.2% by mass sodium hexametaphosphate solution, and dispersed at 40 W for 5 minutes using an ultrasonic device built in the apparatus, and a refractive index of alumina was set at 1.76.

(BET Specific Surface Area)

Using "Macsorb HM model 1208" manufactured by MOUNTECH Co., Ltd. as a specific surface area measuring device, the BET specific surface area was measured by a nitrogen adsorption method (single-point method) in accordance with the method defined in JIS-Z8830 (2013). The measurement conditions were as follows.

Carrier gas: nitrogen/helium mixed gas
Amount of charged sample: 1 g
Sample pretreatment conditions: treatment at 200° C. for 30 minutes
Nitrogen adsorption temperature: liquid nitrogen temperature (−196° C. or less)
Nitrogen desorption temperature: room temperature (about 20° C.)

(Preparation of Alumina Slurry for Viscosity Evaluation)

CMC manufactured by Daicel FineChem Ltd.; part number 1110 (3 parts by weight), isopropyl alcohol (51.6 parts by weight), pure water (292 parts by weight) and alumina (100 parts by weight) were sequentially mixed and stirred, and the obtained mixture was ultrasonically dispersed for 10 minutes. In addition, the mixture was dispersed for 21 minutes using CLEARMIX ("CLM-0.8S" manufactured by M Technique Co., Ltd.) to obtain an alumina slurry for viscosity evaluation.

(Viscosity of Alumina Slurry for Viscosity Evaluation)

Using "TVB10M" manufactured by Toki Sangyo Co., Ltd., the respective viscosities of the alumina slurry for viscosity evaluation were measured when a No. 3 rotor was rotated at 6 rpm, 30 rpm, and 60 rpm.

As the dispersion stability of alumina, a TI value (Thixotropic Index) as an index for determining thixotropy of the alumina slurry was determined by the following formula (2). Alumina having a TI of 4.0 or less was determined to have excellent dispersion stability.

$$TI = \eta_b / \eta_a \quad (2)$$

where $\eta_a$ is viscosity [mPa·s] measured by rotating the No. 3 rotor at 60 rpm, and $\eta_b$ is viscosity [mPa·s] measured by rotating the No. 3 rotor at 6 rpm.

(Deposition Rate)

600 g of alumina balls of 15 mmφ were put in a 1 L plastic container, and 200 g of alumina powder, 2.4 g of SN-Dispersant 5468 (manufactured by SAN NOPCO LIMITED) as a dispersant, and 140 g of water were put therein. The plastic container was rotated at a rotation speed of 80 rpm for 2 hours to prepare an alumina slurry for evaluating a deposition rate.

The alumina slurry for evaluating a deposition rate was poured into a gypsum mold (GIFUKEN SEKKOUKATA KUMIAI KK-2) to be brought into a full state, and when a liquid level decreased, the slurry was added to maintain the full state for 5 minutes, and after 5 minutes, the slurry in the mold was discharged. The gypsum mold after the slurry discharge was dried at 50° C. for 12 hours, then the alumina molded body was taken out from the gypsum mold, and the mass of the alumina molded body was measured. A value obtained by dividing the mass of the alumina molded body by slurry injection time (5 minutes) was taken as the deposition rate [g/min].

(Density of Alumina Sintered Body)

3 g of alumina powder was filled in a 20 mmφ mold and uniaxially press-molded at 29 MPa. The obtained molded body was fired at 1600° C. for 2 hours to obtain an alumina sintered body. The diameter, thickness, and mass of the alumina sintered body were measured, and the density [g/cm$^3$] of the alumina sintered body was calculated.

(Preparation of Laminate Separator)

A porous film (film thickness: 12.4 μm, a basis weight: 7.5 g/m$^2$, air permeability (Gurley value): 184 seconds/100 mL) made of polyethylene was used as a separator (a substrate). One surface of the separator was pretreated by corona discharge irradiation, and then the alumina slurry obtained as described above was applied to the treated surface with a bar coater (#44). Thereafter, the separator after the application was dried at 65° C. for 5 minutes in a hot air circulation dryer to obtain a laminate separator.

(Basis Weight of Laminate Separator)

A 15 cm×20 cm square sample was cut out from the laminate porous separator, a mass W (g) of the sample was measured, and the basis weight (g/m$^2$)=W/(0.15×0.20) of the laminate separator was calculated.

(Water Content of Laminate Separator)

A 15 cm×20 cm square sample was cut out from the laminate porous separator, and the sample was allowed to stand for 24 hours in a glove box in which the dew point was maintained at −30° C. or less. Thereafter, the sample allowed to stand was introduced into a heat vaporizer "ADP-611" manufactured by Kyoto Electronics Manufacturing Co., Ltd. and heated at 120° C., and an amount of moisture vaporized was measured with a Karl Fischer moisture meter "MCU-710/MKC-710" manufactured by Kyoto Electronics Manufacturing Co., Ltd. A value obtained by dividing a measured cumulative moisture value (that is, the total amount of moisture vaporized from the laminate separator) by the basis weight of the laminate separator was taken as a moisture value [ppm] of the laminate separator.

Example 1

An aluminum hydroxide powder having a 50% particle diameter D50 of 50 μm in the volume-based cumulative particle size distribution, a BET specific surface area of 0.2 m$^2$/g, and a Na amount of 0.13% by mass was obtained by the Bayer method. The aluminum hydroxide powder was fired in a rotary furnace to obtain a raw material alumina powder having a BET specific surface area of 4 m$^2$/g and a 50% particle diameter D50 of 54 μm in the volume-based cumulative particle size distribution. The raw material alumina powder was pulverized by a jet mill using superheated steam as a pulverizing gas, and classified by a classifier in which a maximum particle diameter in the classification was set to 3 μm, thereby obtaining an α-alumina powder (1). The temperature and pressure of the superheated steam at the discharge port of the jet nozzle of the jet mill were 315° C. and 3.6 MPa, respectively.

Figure 2:
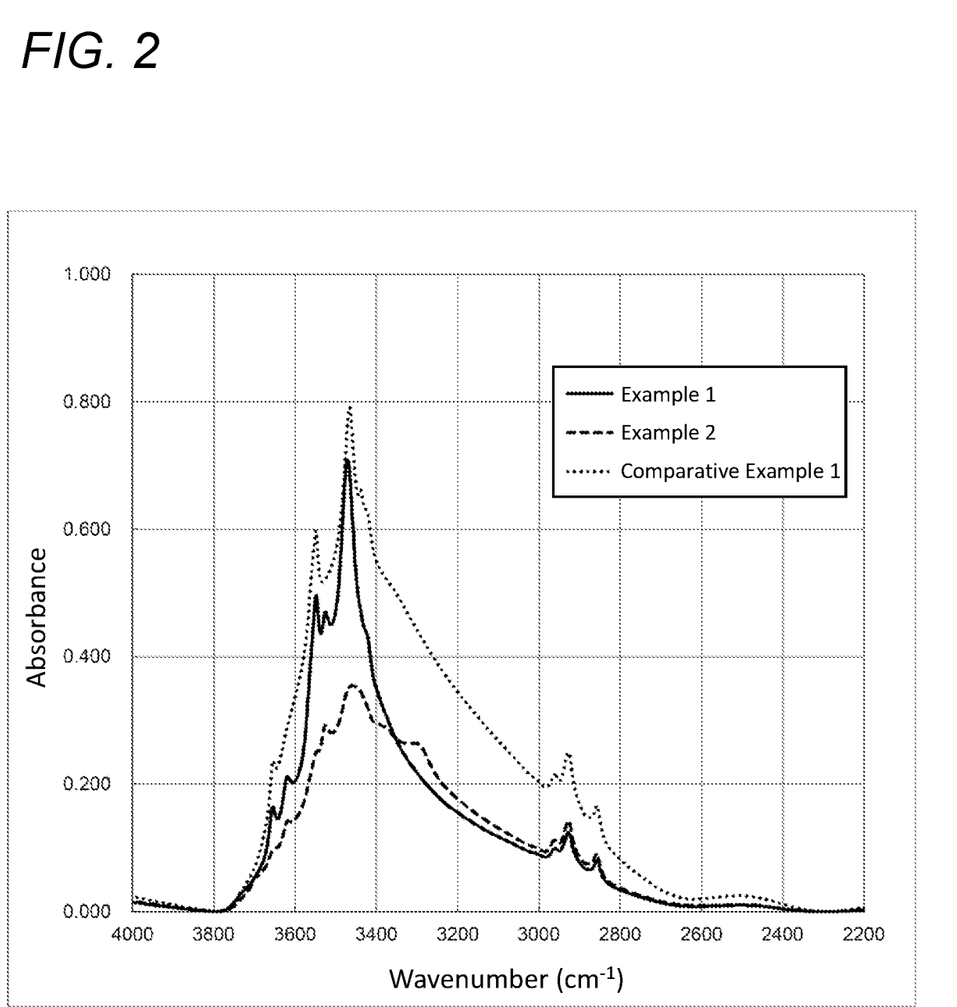
FIG. 2 is a transmission infrared absorption spectrum of alumina obtained by Fourier transform infrared spectroscopy.

As shown in FIG. 1, in the water adsorption/desorption isotherm at 25° C. of the α-alumina powder (1), a difference between the water adsorption amount in the desorption isotherm and the water adsorption amount in the adsorption isotherm was small, and the water desorption index H was as small as 0.09. As shown in FIG. 2, absorption at 3000 to 3200 cm$^{-1}$ derived from an OH group was small in the transmission infrared absorption spectrum of the α-alumina powder (1) obtained by measurement by Fourier transform infrared spectroscopy. From these results, it is found that the water content of the α-alumina powder (1) is controlled to be small. Thus, the alumina slurry for viscosity evaluation prepared using the α-alumina powder (1) had a small TI value of 1.9, and the α-alumina powder (1) was excellent in dispersion stability. The water content of the laminate separator prepared using the alumina slurry is as small as 944 ppm, and the α-alumina powder (1) can also be preferably used for a nonaqueous electrolyte secondary battery.

The evaluation of each physical property is shown in Table 1. In Table 1, "transmission IR OH absorbance" indicates the maximum value of the absorbance at 3000 to 3200 cm$^{-1}$ in the transmission infrared absorption spectrum.

Example 2

An aluminum hydroxide powder having a 50% particle diameter D50 of 45 μm in the volume-based cumulative particle size distribution, a BET specific surface area of 0.4 m$^2$/g, and a Na amount of 0.06% by mass was obtained by the Bayer method. The aluminum hydroxide powder was fired in a tunnel furnace to obtain a raw material alumina powder having a BET specific surface area of 4 m$^2$/g and a 50% particle diameter D50 of 41 μm in the volume-based cumulative particle size distribution. Magnesium carbonate was added to and mixed with the raw material alumina powder in an amount of 0.05% by mass in terms of MgO. Thereafter, in the same manner as in Example 1, the raw material alumina after mixing the magnesium carbonate was pulverized by a jet mill and then classified to obtain an α-alumina powder (2). The Mg content of the α-alumina powder (2) was 265 ppm by mass.

As shown in FIG. 1, in the water adsorption/desorption isotherm at 25° C. of the α-alumina powder (2), a difference between the water adsorption amount in the desorption isotherm and the water adsorption amount in the adsorption isotherm was small, and the water desorption index H was as small as 0.07. As shown in FIG. 2, absorption at 3000 to 3200 cm$^{-1}$ derived from an OH group was small in the transmission infrared absorption spectrum of the α-alumina powder (2) obtained by measurement by Fourier transform infrared spectroscopy. In particular, the generation of gibbsite species indicated by absorption at 3400 to 3500 cm$^{-1}$ was suppressed. From these results, it is found that the water content of the α-alumina powder (2) is controlled to be small. Thus, the alumina slurry for viscosity evaluation prepared using the α-alumina powder (2) had a small TI value of 2.1, and the α-alumina powder (2) was excellent in dispersion stability. The water content of the laminate separator prepared using the alumina slurry is as small as 909 ppm, and the α-alumina powder (1) can also be preferably used for a nonaqueous electrolyte secondary battery.

The deposition rate of the slurry for evaluating a deposition rate, which was prepared using the α-alumina powder (2), was 11.0 g/min, which was faster than that in Comparative Example 2 described later, and, in addition, the alumina sintered body prepared using the α-alumina powder (2) had a density equivalent to that in Comparative Example 2 described later. As described above, by using the α-alumina powder (2), it is possible to obtain an alumina sintered body having a density equivalent to that of the related art while improving the deposition rate of the alumina slurry, and therefore, the α-alumina powder (2) can also be preferably used for slip casting.

The evaluation of each physical property is shown in Table 1.

Comparative Example 1

An aluminum hydroxide powder having a 50% particle diameter D50 of 50 μm in the volume-based cumulative particle size distribution, a BET specific surface area of 0.2 m$^2$/g, and a Na amount of 0.13% by mass was obtained by the Bayer method. The aluminum hydroxide powder was fired in a rotary furnace to obtain a raw material alumina powder having a BET specific surface area of 4 m$^2$/g and a 50% particle diameter D50 of 54 μm in the volume-based cumulative particle size distribution. The raw material alumina was pulverized under the following conditions using a vibration mill "YAMP-4JNT" manufactured by Uras Techno Co., Ltd.

Pot volume: 2 liters
Material of pot: alumina
Pulverizing medium: φ 15 mm alumina ball
Amount of pulverizing media filled: 3 kg
Addition amount of raw material alumina: 50 g
Pulverization amplitude: 3 mm
Pulverizing time: 3 hours As shown in FIG. 1, in the water adsorption/desorption isotherm at 25° C. of the α-alumina powder (3) obtained by the above operation, the difference between the water adsorption amount in the desorption isotherm and the water adsorption amount in the adsorption isotherm was large, and the water desorption index H was as large as 0.16. As shown in FIG. 2, absorption at 3000 to 3200 cm$^{-1}$ derived from an OH group was large in the transmission infrared absorption spectrum of the α-alumina powder (3) obtained by measurement by Fourier transform infrared spectroscopy. From these results, it is found that the water content of the α-alumina powder (3) is large.

The alumina slurry prepared using the α-alumina powder (3) had a large TI value of 6.5, and the α-alumina powder (3) was poor in dispersion stability. The water content of the laminate separator prepared using the alumina slurry was as large as 2431 ppm.

The evaluation of each physical property is shown in Table 1.

Comparative Example 2

An alumina powder having a 50% particle diameter D50 of 54 μm in the volume-based cumulative particle size distribution was pulverized under the following conditions to obtain an α-alumina powder (4).

Pot volume: 2 liters
Material of pot: alumina
Pulverizing medium: φ 15 mm alumina ball
Amount of pulverizing media filled: 1.7 kg
Addition amount of raw material alumina: 210 g
Rotation speed: 79 rpm
Pulverizing time: 52 hours The α-alumina powder (4) had a large water desorption index H of 0.19. Although the alumina sintered body prepared using the α-alumina powder (4) had a density equivalent to that in Example 2, the deposition rate of the slurry for evaluating a deposition rate, which was prepared using the α-alumina powder (4), was 8.5 g/min, which was slower than that in Example 2.

The evaluation of each physical property is shown in Table 1.

TABLE 1

| | Alumina powder | | | | | | | Alumina slurry | | Alumina sintered | Laminate separator |
|---|---|---|---|---|---|---|---|---|---|---|---|
| | Water desorption index H | Transmission IR OH absorbance | BET specific surface area ($m^2/g$) | D10 (μm) | D50 (μm) | D90 (μm) | TI value | Viscosity 30 rpm (mPa·s) | deposition rate (g/min) | body Density ($g/cm^3$) | Water content (ppm) |
| Example 1 | 0.09 | 0.16 | 6.4 | 0.36 | 0.68 | 1.7 | 1.9 | 27 | — | — | 944 |
| Example 2 | 0.07 | 0.18 | 5.0 | 0.32 | 0.60 | 1.5 | 2.1 | 25 | 11.0 | 3.89 | 909 |
| Comparative Example 1 | 0.16 | 0.35 | 7.1 | 0.21 | 0.50 | 3.4 | 6.5 | 1965 | — | — | 2431 |
| Comparative Example 2 | 0.19 | 0.37 | 8.2 | 0.21 | 0.53 | 14.8 | — | — | 8.5 | 3.89 | — |

The invention claimed is:

1. Alumina having a water desorption index H defined by the following formula (1) of 0.15 or less in a water adsorption/desorption isotherm at 25° C.:

$$\text{water desorption index } H = (V_{d0.5} - V_{a0.5}) \div V_{a0.9} \quad (1)$$

where
- $V_{d0.5}$ represents a water adsorption amount [mg/g] per 1 g of alumina in a desorption isotherm at a relative water vapor pressure of 0.5,
- $V_{a0.5}$ represents a water adsorption amount [mg/g] per 1 g of alumina in an adsorption isotherm at a relative water vapor pressure of 0.5, and
- $Va_{0.9}$ represents a water adsorption amount [mg/g] per 1 g of alumina in the adsorption isotherm at a relative water vapor pressure of 0.9, wherein the alumina is α-alumina,
wherein the alumina has a 50% particle diameter D50 of 1.0 μm or less in the volume-based cumulative particle size distribution, and
wherein the alumina has a 90% particle diameter D90 of 2.0 μm or less in the volume-based cumulative particle size distribution.

2. The alumina according to claim 1, wherein a maximum value of absorbance at 3000 to 3200 $cm^{-1}$ is 0.30 or less in a transmission infrared absorption spectrum obtained by measuring a sample, prepared using the alumina and having a diameter of 10 mm and a mass of 20 mg, by Fourier transform infrared spectroscopy.

3. The alumina according to claim 1, containing one or more elements selected from the group consisting of K, Mg, Ca, Sr, Ba, and La, in which a total content of the element is 200 ppm by mass or more and 50000 ppm by mass or less.

4. The alumina according to claim 1, having a 10% particle diameter D10 of 0.25 μm or more in a volume-based cumulative particle size distribution.

5. The alumina according to claim 1, having a BET specific surface area of 1 $m^2/g$ or more and 10 $m^2/g$ or less.

6. An alumina slurry comprising:
the alumina according to claim 1;
a binder; and
a solvent.

7. An alumina film comprising:
the alumina according to claim 1; and
a binder.

8. A laminate separator comprising:
a separator; and
the alumina film according to claim 7 formed on a surface of the separator.

9. A nonaqueous electrolyte secondary battery comprising:
the alumina film according to claim 7 formed on a surface of at least one of a positive electrode;
a negative electrode; and
a separator.

10. A method of manufacturing a nonaqueous electrolyte secondary battery, comprising:
applying the alumina slurry according to claim 6 to a surface of at least one of a positive electrode, a negative electrode, and a separator; and
drying the alumina slurry to form an alumina film.

* * * * *